(12) United States Patent
Liang

(10) Patent No.: US 7,832,528 B1
(45) Date of Patent: Nov. 16, 2010

(54) BRAKE MECHANISM FOR OPERATING TABLE

(75) Inventor: Jyh-Wei Liang, Alexandria, VA (US)

(73) Assignee: Amtai Medical Equipment, Inc., Raleigh, NC (US)

( * ) Notice: Subject to any disclaimer, the term of this patent is extended or adjusted under 35 U.S.C. 154(b) by 0 days.

(21) Appl. No.: 12/485,097

(22) Filed: Jun. 16, 2009

(51) Int. Cl.
*B60T 3/00* (2006.01)

(52) U.S. Cl. .................................. 188/5; 5/611; 5/614

(58) Field of Classification Search ............. 188/5; 5/604, 611, 614
See application file for complete search history.

(56) References Cited

U.S. PATENT DOCUMENTS

| | | | |
|---|---|---|---|
| 3,820,176 A * | 6/1974 | Feiertag | 5/611 |
| 4,910,816 A * | 3/1990 | Lansing | 5/604 |
| 5,220,698 A * | 6/1993 | Hannant | 5/611 |
| 5,704,601 A * | 1/1998 | Mangelsen et al. | 269/57 |
| 2006/0026762 A1* | 2/2006 | Hornbach et al. | 5/611 |

* cited by examiner

*Primary Examiner*—Christopher P Schwartz
(74) *Attorney, Agent, or Firm*—Leong C. Lei

(57) ABSTRACT

A brake mechanism is provided on one of four corners of a rectangular base of an operating table. Each brake mechanism has a cam fixed by a rotating shaft, an a hydraulic cylinder and a braking post. When braking, the hydraulic cylinder pushes the cam to rotate, and the cam abuts the braking post to press against the floor. Wheels on the base of the operating table depart upward a distance from the floor for braking. Detecting sheets are provided on the rotating shafts of two brake mechanisms which stand on the same sides. The detecting sheets match detectors to control action of the hydraulic cylinders.

5 Claims, 6 Drawing Sheets

BRAKE MECHANISM FOR OPERATING TABLE

BACKGROUND OF THE INVENTION (a) Field of the Invention

The present invention relates to a brake mechanism for operating tables, and particularly to a brake mechanism for operating tables which can be adapted for use in uneven floor.

(b) Description of the Prior Art

Although a floor in an operating room is generally flatter than average floors, according to the principle which states that three points determine one plane, the operating table with four braking points is often unable to place the four braking points on a common plane. Thus two braking posts at the same side need to be provided with bolts for adjusting length of braking posts which is inconvenient.

One of the conventional solutions is a brake mechanism with three points. Such a brake mechanism has three points fixed on a base of the operating table for contact with the floor. For the purpose of moving the operating table, a wheel is extended to push the base of the operating table a small distance away from the floor. However, a brake mechanism with three points lacks reliability of a brake mechanism with four points during an operation.

In addition, as for a conventional method of oil pressure power driving the braking posts directly, the hydraulic cylinder bears weight of the operating table and a patient for a long time. As a result, the O-shaped ring in the hydraulic cylinder tends to abrade and leak oil.

SUMMARY OF THE INVENTION

An object of the present invention is to provide a brake mechanism for an operating table, the operating table having four cams driven by hydraulic cylinders for positioning braking posts. Four braking posts are respectively provided on corners of a rectangular base of an operating table for making the base of the operating table stable. Even if the floor is uneven, four braking posts are automatically retained to the floor, whereby the operating table is stable optimally.

Another object of the present invention is to provide a brake mechanism for an operating table, the operating table has hydraulic cylinders connected in parallel. Each brake mechanism comprises a cam fixed by a rotating shaft, a hydraulic cylinder and a braking post. When braking, the hydraulic cylinder pushes the cam to rotate, and the cam abuts the braking post to press against the floor. Wheels on the base of the operating table depart upward a distance from the floor for braking.

A further object of the present invention is to provide a brake mechanism for an operating table, wherein reverse force of a cam thereof pushes a braking post in the same direction as that of a hydraulic cylinder extending out when the hydraulic cylinder extends completely to a specified limit and acts on the cam, the braking post bears feeding force of weight of the operating table and a patient while the operating table is resting, and a rod of the hydraulic cylinder does not draw back to exert to the hydraulic pressure system, whereby the hydraulic pressure system need not bear weight of the operating table and the patient for a long time, lest risk of oil leakage, and the braking device is improved in duration.

A further object of the present invention is to provide a brake mechanism for an operating table which has a conductive rubber embedded on a bottom surface of the cylindrical post, whereby friction for arresting the operating table is enhanced, and static-electricity on the operating table is conducted to the conductive floor in the operating room by the conductive rubber.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
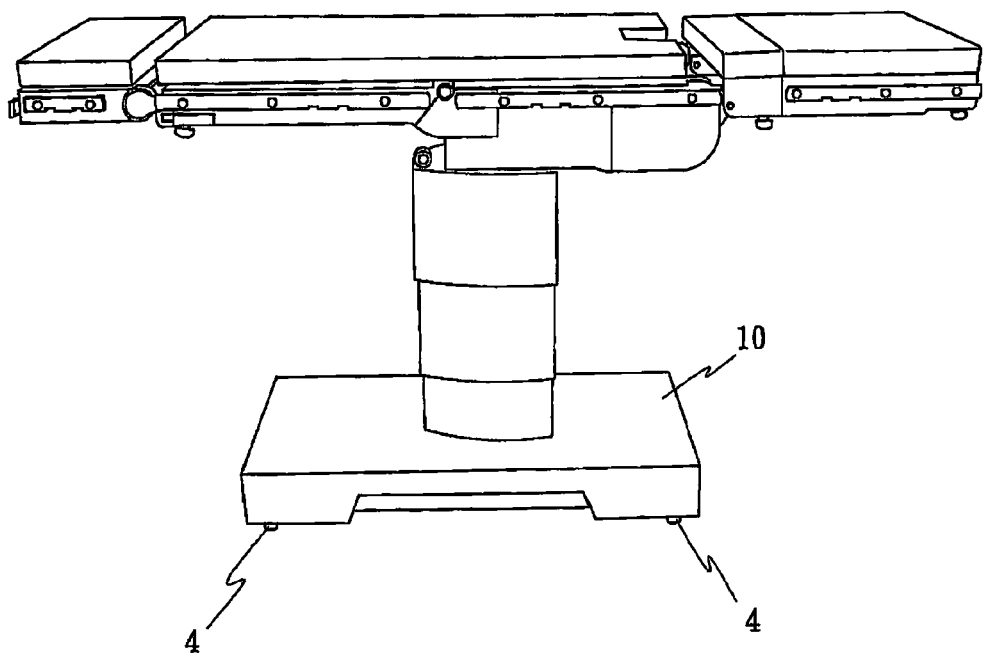
FIG. 1 illustrates a brake mechanism of the present invention being applied to an operating table.
Figure 2:
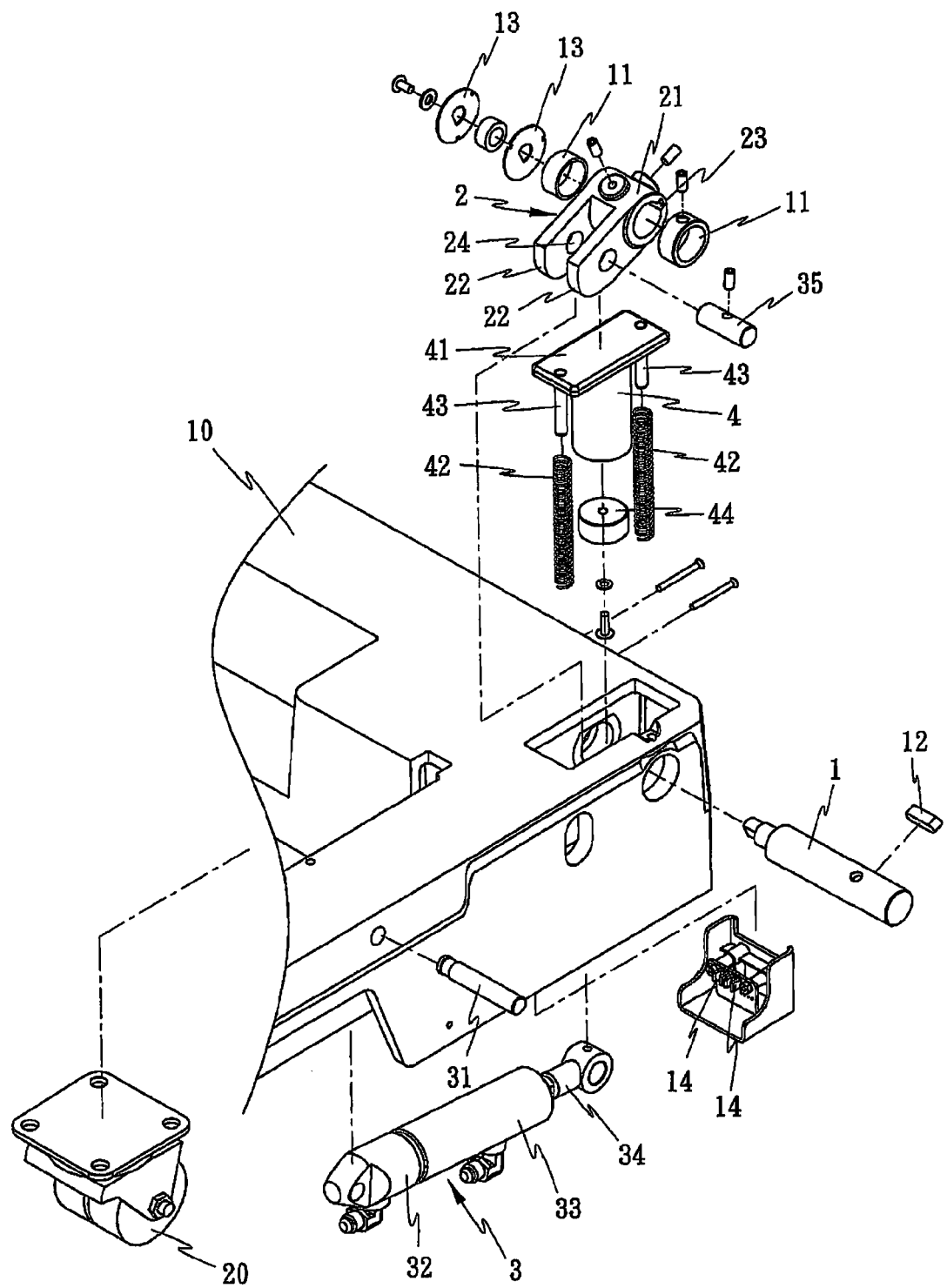
FIG. 2 is an exploded view of the brake mechanism of the present invention.
Figure 3:
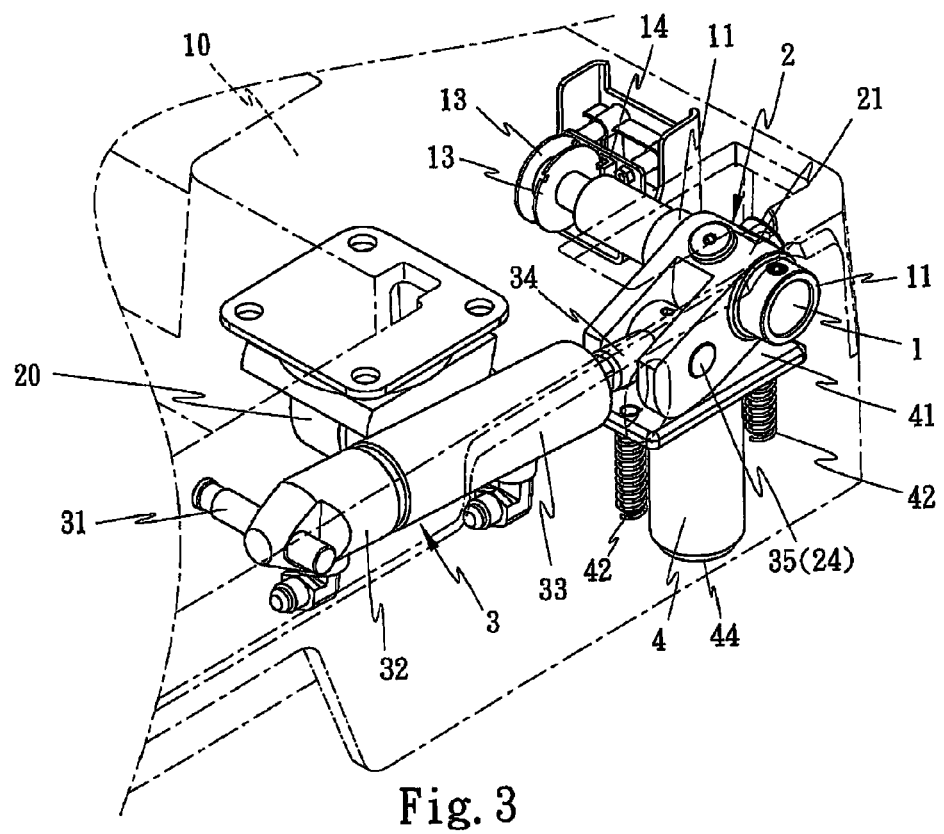
FIG. 3 is an assembled view of the brake mechanism of FIG. 2.

With reference to FIGS. 1 through 3, four brake mechanisms for operating table according to the present invention are provided on four corners of a rectangular base 10 of an operating table. At least three wheels 20 are provided on the base 10. Each brake mechanism comprises a cam 2 fixed by a rotating shaft 1, a hydraulic cylinder 3 and a braking post 4.

The rotating shaft 1 for pivotally mounting the cam 2 on the base 10. Sleeves 11 are put over two ends of the rotating shaft 1 for engaging with the base 10. A fixing key 12 is embedded in an intermediate portion of the rotating shaft 1. Two detecting sheets 13 are provided on an end of the rotating shaft 1. The two detecting sheets 13 respectively correspond to two detectors 14 for controlling positioning of the operating table or releasing the brake mechanism of the operating table.

The cam 2 provides the braking post 4 with optimal translating offset distance, and comprises a hub 21 and a pair of lugs 22 extending from opposite ends of the hub 21. A through hole (not labeled) is defined through a center of the hub 21 for receiving the rotating shaft 1. A key groove 23 is defined in the through hole for matching the fixing key 12. Thus the cam 2 drives the rotating shaft 1 to rotate synchronously. Shaft holes 24 are respectively defined in the lugs 22.

Figure 9:
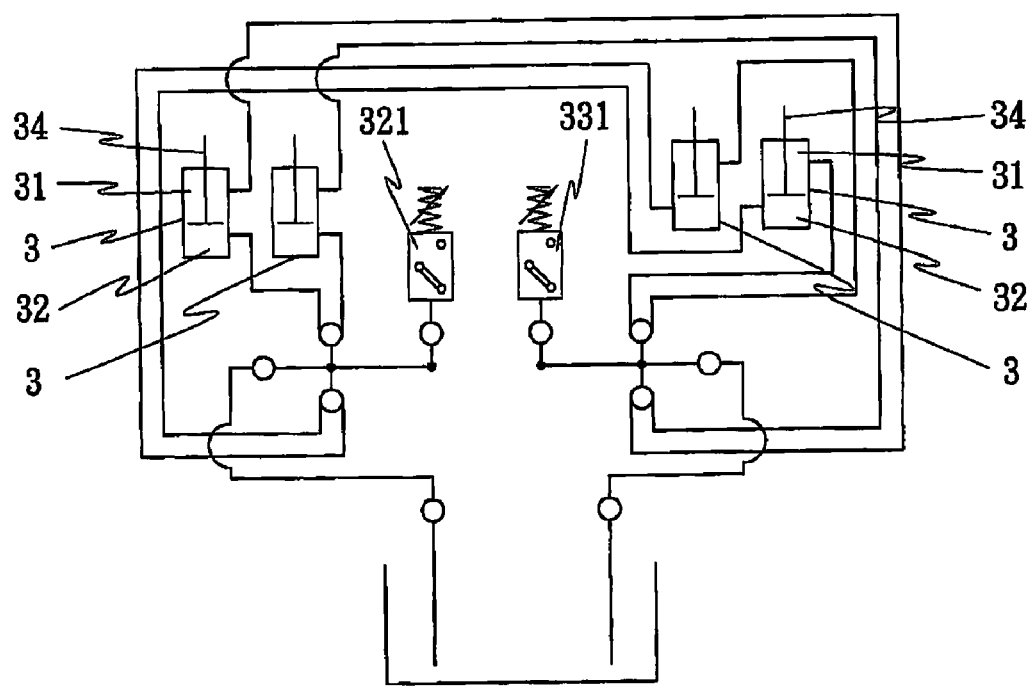
FIG. 9 schematically shows a parallel oil path of the oil pressure tanks.

The hydraulic cylinder 3 comprises a first cylinder 32 and a second cylinder 33. A rod 31 pivots the first cylinder 32 to the base 10. A rod 34 extends out of the second cylinder 33 and engages with the shaft holes 24 via an axle 35. In this way, the oil paths of the hydraulic cylinders 3 are arranged in parallel, as shown in FIG. 9. The oil path of the first cylinder 32 is provided with a first pressure switch 321 for detecting the state whether the rod 34 extends to a specified limit. The oil path of the second cylinder 33 is provided with a second pressure switch 331 for detecting the time when the suspending braking post 4 presses against the ground.

The braking post 4 is a cylindrical member provided at the top with a platform 41. Two positioning posts 43 downwardly depend from a bottom of the platform 41 and at both sides of the braking post 4 for supporting springs 42. The braking post 4 ascends in the base 10 by means of the springs 42. A conductive rubber 44 is provided on a bottom surface of the braking post 4. As a result, friction for positioning the operating table is enhanced, and static electricity on the operating table is conducted to the conductive ground in the operating room by the conductive rubber 44.

Figure 4:
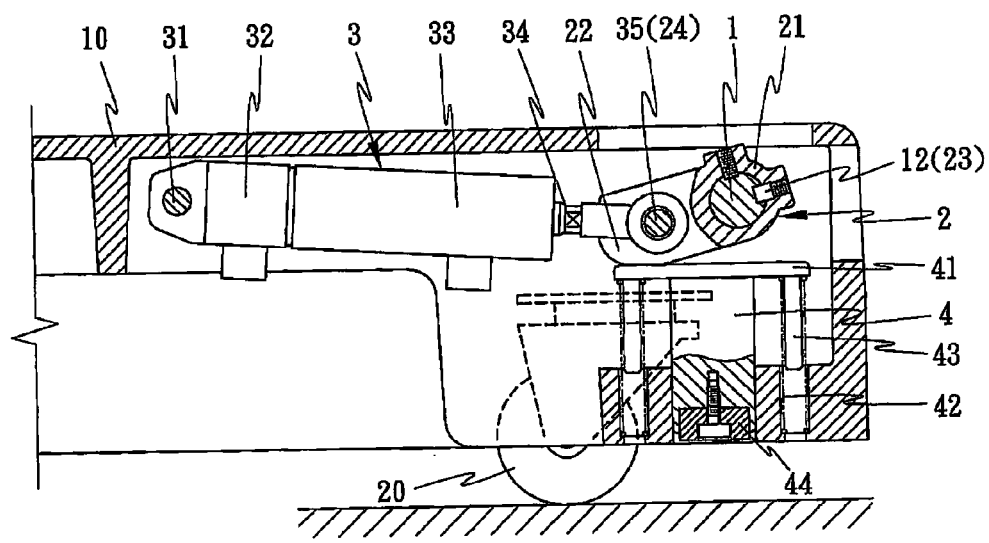
FIG. 4 is a cross-sectional view of the brake mechanism of FIG. 3, wherein the brake mechanism is released.

Referring to FIGS. 3 and 4, the cam 2 is driven by the rod 34 and rotates with the rotating shaft 1. When the cam 2 rotates, the lugs 22 press against the platform 41 of the braking post 4. The braking post 4 produces translating offset distance. When the rod 34 extends outward to a specified limit, the cam 2 allows the braking post 4 to retract slightly. Then the braking post 4, which presses against the ground incompletely, is pressed by the cam 2 against the ground completely by means of controlling retraction of the rod 34. Thus the operating table is reliably kept in position on the uneven floor.

Figure 5:
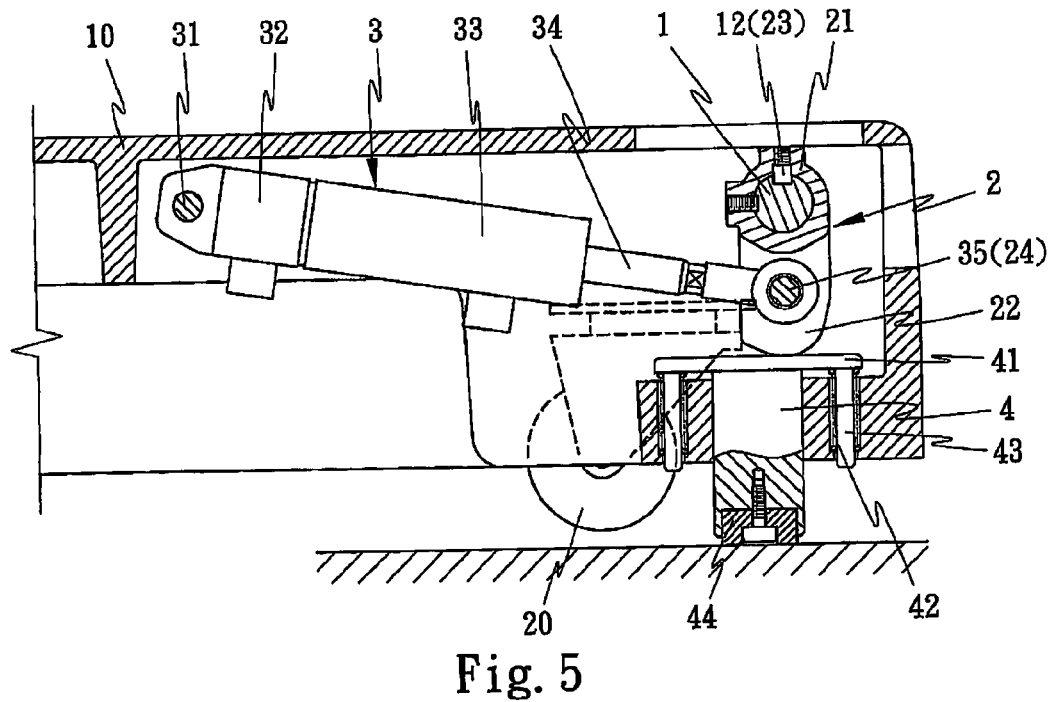
FIG. 5 schematically shows a braking post being pushed by a cam to extend out to a specified limit.
Figure 6:
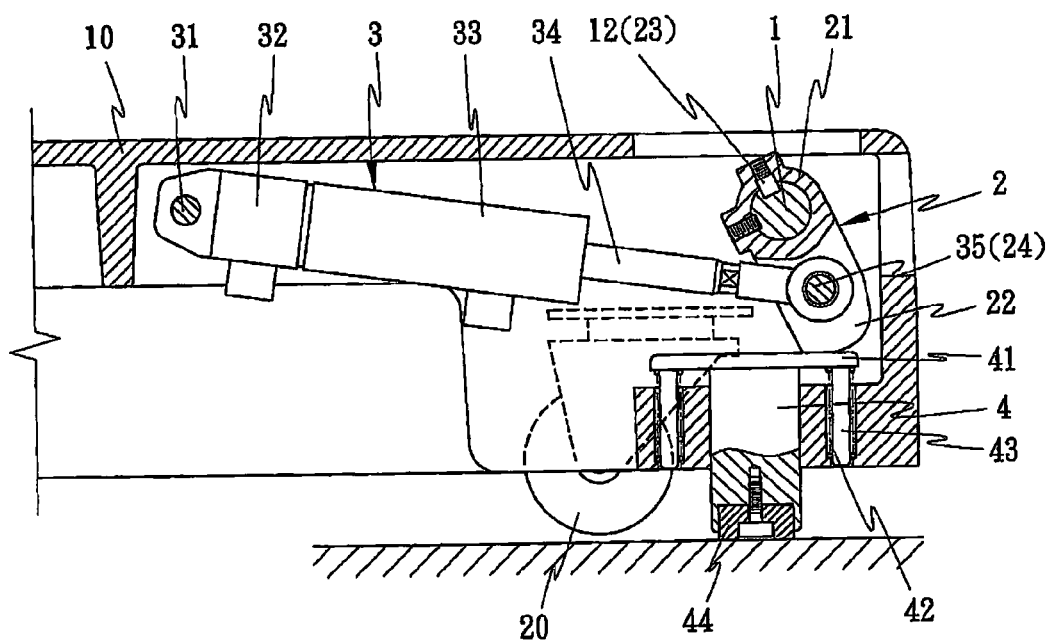
FIG. 6 is a cross-sectional view of the brake mechanism of FIG. 3, wherein the brake mechanism is being applied.

Referring to FIG. 5, before the braking post 4 finishes a brake mechanism action, the rod 34 of the hydraulic cylinder 3 does not extend to the specified limit. The lugs 22 of the cam 2 push the braking post 4 downwardly to a lowest position which is lower than the wheel 20. When the rod 34 of the hydraulic cylinder 3 extends to the specified limit, as shown in FIG. 6, the lugs 22 continue to rotate toward the rod 34 such that the working diameter of the lug 22 decreases. The braking post 4 returns back a short length of distance due to the return force of the springs 42. The first cylinder 32 provides a pressure beyond a predetermined value of the pressure switch 321 thereby stopping the rod 34 from extending out further. A bottom of the braking post 4 is lower than the wheel 20. The wheel 20 is supported by the braking post 4 to depart a distance from the ground.

Figure 7:
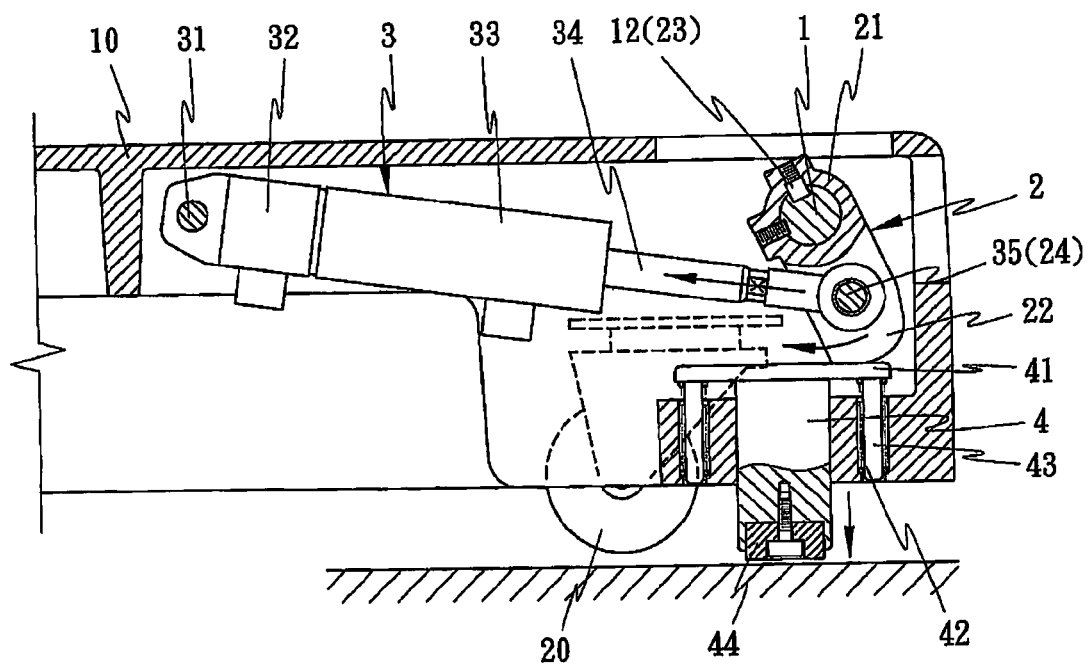
FIG. 7 schematically shows a braking post pressing against the ground incompletely and being suspended.

It is desired that each braking post 4 presses against the ground completely and the operating table will not rock for uneven ground. In other words, when a certain braking post 4 presses against the ground incompletely and suspends, as shown in FIG. 7. Hydraulic pressure is input to the second cylinder 33 of the hydraulic cylinder 3 for drawing the rod 34 back. The four hydraulic cylinders 3 are built in the parallel hydraulic pressure system. The hydraulic cylinder 3 undergoing least pressure acts firstly. Output pressure from the hydraulic pressure system is equal to inner pressure of the hydraulic cylinder 3 in the action. Before the suspended braking post 4 presses against the floor, the pressure of the hydraulic pressure system ascends vastly and rapidly owing to the weight of the whole operating table. The pressure switch 331, which has been set appropriately, may detect the time readily, and respond actually and timely to halt action of the hydraulic pressure system. Even if the ground is uneven, the four braking posts 4 press against the floor automatically and reliably, whereby the operating table is supported optimally.

Figure 8:
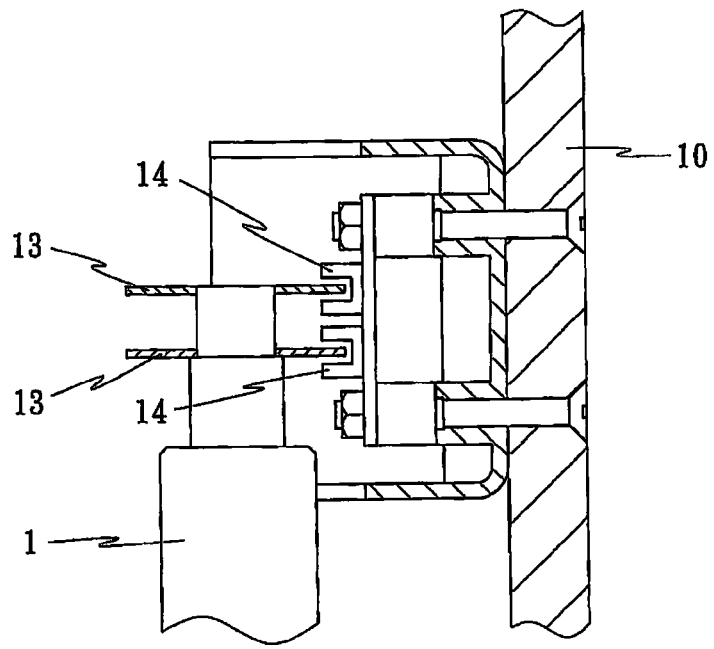
FIG. 8 schematically shows assembly of detectors and detecting sheets.

In order to control action time and state of the four hydraulic cylinders 3 precisely, two braking mechanisms, which lie on the same side, connect with a pair of detecting sheets 13. The detecting sheets 13 match with the detectors 14 for controlling action of the hydraulic cylinder (see FIG. 8). The detectors 14 work as a light shielder. As the detecting sheets 13, the cam 2 and the rotating shaft 1 rotate simultaneously, sensing cutouts on edges of the detecting sheets 13 will produce sensing signals. The sensing signals from the detecting sheets 13 will determine the time for the hydraulic cylinder 3 to the cam 2, and also time for the cam 2 to push the braking post 4. In addition, action state of the hydraulic cylinder 3 is timed to detect the completion state thereof. When the detectors 14 are out of work, the hydraulic cylinder 3 will be controlled to work normally.

When the brake has been applied to the operating table, reaction force of the cam 2 pushing the braking post 4 is in the same direction as the pushing force of the hydraulic cylinder 3. The braking post 4 bears feedback force of weight of the operating table and the patient. The rod 34 does not draw back to exert to the hydraulic pressure system but exert to the hydraulic cylinder 3. Thus the hydraulic pressure system need not bear weight of the operating table and the patient for a long time, lest risk of oil leakage. The braking device is improved in duration.

It is of course to be understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A brake mechanism for an operating table, being adapted to be provided on one of four corners of a rectangular base of the operating table, at least three wheels being provided on the base, the brake mechanism comprising a cam fixed by a rotating shaft, a hydraulic cylinder and a braking post, the rotating shaft including a shaft pole for pivoting the cam to the base;

the cam providing the braking post with a translating offset distance, and including a hub and lugs, a central groove being defined through a center of the hub for surrounding the rotating shaft for rotation, shaft holes being respectively defined in the lugs;

the hydraulic cylinder having a first cylinder and a a second cylinder, a branch pivoting the first cylinder to the base, a rod extending out of the second cylinder and engaging with the shaft holes of the cam via a rotating bar; and a braking post including a cylindrical post and a platform on a top of the cylindrical post, positioning posts downwardly depending from a bottom of the platform and at both sides of the cylindrical post for supporting springs, the braking post ascending in the base by means of the springs;

wherein when the cam is driven by the rod of the hydraulic cylinder and rotates with the rotating shaft, the lugs pressing downwardly against the platform of the braking post, the braking post producing a translating offset distance, when the rod extends outward to a specified limit, the cam allowing the braking post to retract, the brake mechanism, whose braking post presses against floor incompletely, being pressed by the cam against the floor completely by means of controlling the rod to shrink, whereby the operating table is kept in position on uneven floor.

2. The brake mechanism for operating table as claimed in claim 1, wherein sleeves are provided around the shaft poles of the rotating shaft for engaging with the base.

3. The brake mechanism for operating table as claimed in claim 2, wherein a fixing key is embedded in a middle of the rotating shaft, and a key groove is defined in a central groove for matching the fixing key.

4. The brake mechanism for operating table as claimed in claim 1, wherein action state of the hydraulic cylinder is timed to detect completion state thereof.

5. The brake mechanism for operating table as claimed in claim 1, wherein conductive rubbers are provided on a bottom surface of the braking post.

* * * * *